UNITED STATES PATENT OFFICE.

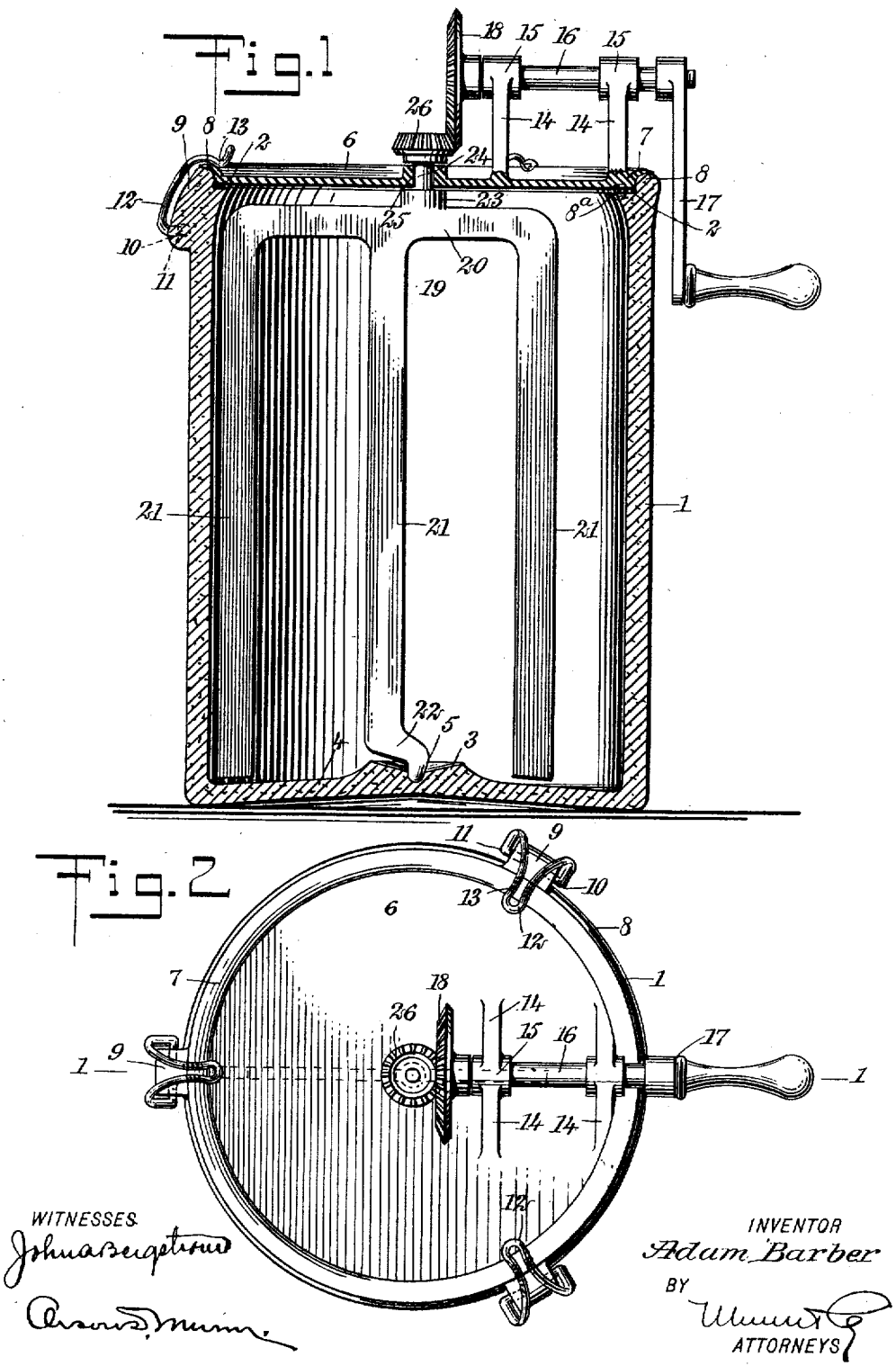

ADAM BARBER, OF WATSONVILLE, CALIFORNIA.

CHURN.

No. 903,042.    Specification of Letters Patent.    Patented Nov. 3, 1908.

Application filed July 31, 1908. Serial No. 446,265.

*To all whom it may concern:*

Be it known that I, ADAM BARBER, a citizen of the United States, and a resident of Watsonville, in the county of Santa Cruz and State of California, have invented a new and Improved Churn, of which the following is a full, clear, and exact description.

This invention relates to churns, and more particularly such as are provided with improved dashers whereby a more effective action is brought about in churning.

The object of the invention is to provide a device of the class described, simple and efficient in construction and inexpensive to manufacture, which is provided with a dasher having three vertical blades, the intermediate blade serving pivotally to mount the dasher in position and to facilitate its rotation.

Reference is to be had to the accompanying drawings forming a part of this specification, in which similar characters of reference indicate corresponding parts in both the views.

Figure 1 is a longitudinal section of an embodiment of my invention, on the line 1—1 of Fig. 2; and Fig. 2 is a plan view of the invention.

In the specific form shown in the drawings, I provide a churn casing 1 of any suitable material, such as stone-ware, wood, metal or the like, and having an annular shoulder 2 at the inside of its upper rounded edge. The casing further has a projection 3 on the inside of its bottom 4. This projection has a recess 5 at its center which constitutes a bearing, as will be hereinafter described. Adapted to seat on the shoulder 2 of the casing is a cover 6 of any suitable material, such as sheet metal or the like, and provided with an outwardly disposed curved flange 7 which rests against the curved portion 8 of the upper edge of the casing, so that a tight joint is formed. If so desired a washer or gasket 8ª can be interposed between the cover and the shoulder.

Located at suitable points around the upper edge of the casing are ears 9 extending therefrom, which have openings 10 on opposite sides thereof. Adapted to have their ends 11 arranged in these openings are resilient keepers 12 formed of any suitable material such as wire or the like. As shown most clearly in Fig. 1, these keepers have a portion 13 near their looped ends which rests against the cover 6 to hold the latter tightly in position on the casing.

I further provide an operating mechanism, which includes uprights 14 rigid with the cover, and having their upper ends formed to constitute bearings 15. A horizontal shaft 16 is carried by these bearings and has a hand crank 17 secured to its outer end, while a bevel gear 18 is carried by its inner end. Arranged within the casing is a dasher 19 which includes a cross member 20 at the upper end thereof, the latter carrying three vertical blades 21 preferably integral therewith. The intermediate blade has its lower end 22 laterally and downwardly disposed so that it rests in the bearing 5 at the bottom of the casing. This construction permits the intermediate blade to perform the double function of assisting in the stirring of the contents and of rotatably supporting the dasher in place.

The cross member 20 of the dasher has a projection 23 on its upper side which is in alinement with the end 22 of the intermediate blade 21. The upper surface of the projection 23 is adjacent to the under side of the cover 6. A stem 24 having a smaller diameter than that of the projection 23, extends through a bearing 25 substantially at the center of the cover 6. Secured to one end of the stem 24 outside of the cover 6, is a bevel pinion 26 which is in mesh with the bevel gear 18, so that the dasher can be directly operated by the hand crank.

It has been found to be of great advantage to construct the casing of stone-ware, as the cream can be kept in the casing until it is to be churned, when the churning mechanism may be placed directly in the casing without the necessity of removing the contents first into a churn, as is commonly done. Further, the use of stone-ware allows the device to be thoroughly cleansed after using and obviates any souring, such as often takes place where wooden churns are employed.

It should be noted that the blades of the dasher are so positioned that they rotate in concentric circles about the axis of rotation, as the blades are all at different distances therefrom. The lower end 22 of the intermediate blade, together with the projection and stem 23 and 24 respectively serve to journal the dasher in position, and are in alinement with its axis of rotation.

Having thus described my invention, I claim as new and desire to secure by Letters Patent:—

1. A churn comprising a casing and a rotatable dasher therein, said dasher having a plurality of blades at different distances from the axis of rotation of said dasher, one of said blades being journaled rotatably to support said dasher.

2. A churn comprising a casing and a rotatable dasher therein, said dasher being concentric with respect to the axis of said casing.

3. A churn comprising a casing and a dasher therein, said dasher having a plurality of blades at different distances from the axis of rotation of said dasher, one of said blades having a part offset into alinement with the axis of rotation of said dasher, and serving rotatably to support said dasher.

4. A churn comprising a casing and a dasher therein, said dasher having a plurality of blades at different distances from the axis of rotation of said dasher, one of said blades having a part offset into alinement with the axis of rotation of said dasher, said dasher further having a projection in alinement with the axis of rotation, said projection and said offset portion being to support said dasher in position.

5. A churn comprising a casing, a cover carried by said casing, resilient means for holding said cover in position on said casing, a dasher having a plurality of vertical blades arranged within said casing, one of said blades serving to support said dasher in position, and a manually operable mechanism carried by said cover and adapted to operate said dasher.

6. A churn comprising a casing, a cover carried by said casing, resilient means for holding said cover in position on said casing, a dasher having a plurality of vertical blades, one of said blades having a laterally and downwardly extending projection adapted to engage at the bottom of said casing and serving to support said dasher in place, and a manually operable mechanism carried by said cover and adapted to operate said dasher.

In testimony whereof I have signed my name to this specification in the presence of two subscribing witnesses.

ADAM BARBER.

Witnesses:
 EUGENE KELLY,
 WM. F. PALMTAG.